(12) United States Patent
Blong et al.

(10) Patent No.: US 6,984,697 B2
(45) Date of Patent: Jan. 10, 2006

(54) FLUOROPOLYMERS RESISTANT TO STRESS CRACKING

(75) Inventors: Thomas J. Blong, Woodbury, MN (US); Lisa P. Chen, St. Paul, MN (US); Ralph Kaulbach, Emmerting (DE); Friedrich Kloos, Kastl (DE); Georg Burkard, Altötting (DE)

(73) Assignee: 3M Innovative Properties Company, Saint Paul, MN (US)

( * ) Notice: Subject to any disclaimer, the term of this patent is extended or adjusted under 35 U.S.C. 154(b) by 196 days.

(21) Appl. No.: 10/680,537

(22) Filed: Oct. 7, 2003

(65) Prior Publication Data

US 2004/0072935 A1    Apr. 15, 2004

Related U.S. Application Data

(62) Division of application No. 09/904,235, filed on Jul. 12, 2001, now Pat. No. 6,653,379.

(51) Int. Cl.
C08L 27/12        (2006.01)

(52) U.S. Cl. ............... 525/200; 524/379; 524/544; 524/545; 524/805; 526/89; 526/206; 526/247

(58) Field of Classification Search ........... 524/379, 524/546, 545, 805; 525/200; 526/89, 206, 526/247
See application file for complete search history.

(56) References Cited

U.S. PATENT DOCUMENTS

| | | | | |
|---|---|---|---|---|
| 4,029,868 | A | * | 6/1977 | Carlson ............... 526/247 |
| 4,262,101 | A | * | 4/1981 | Hartwimmer et al. ...... 526/89 |
| 4,546,157 | A | | 10/1985 | Nakagawa et al. |
| 4,552,925 | A | | 11/1985 | Nakagawa et al. |
| 4,587,316 | A | | 5/1986 | Nakagawa et al. |
| H130 | H | | 9/1986 | McDermott et al. |
| 4,743,658 | A | | 5/1988 | Imbalzano et al. |
| 5,461,129 | A | | 10/1995 | Kurihara et al. |
| 5,677,404 | A | | 10/1997 | Blair |
| 5,688,885 | A | | 11/1997 | Blair |
| 5,700,889 | A | * | 12/1997 | Blair .................... 526/247 |
| 5,703,185 | A | * | 12/1997 | Blair .................... 526/247 |
| 5,760,151 | A | | 6/1998 | Aten et al. |
| 6,489,420 | B1 | * | 12/2002 | Duchesne et al. ......... 526/255 |

FOREIGN PATENT DOCUMENTS

| | | | |
|---|---|---|---|
| EP | 0 258 036 | A2 | 3/1988 |
| EP | 0 423 995 | A1 | 4/1991 |
| EP | 0 789 038 | B1 | 8/1997 |
| EP | 789038 | A1 * | 8/1997 |
| EP | 789039 | A1 * | 8/1997 |
| EP | 0 969 055 | A1 | 1/2000 |
| JP | S58-69241 | | 4/1982 |
| JP | 02520433 | | 6/1989 |
| JP | 02569090 | | 6/1989 |
| JP | 08041267 | | 2/1996 |
| JP | 96073689 | | 3/1996 |
| JP | 10001585 | | 1/1998 |
| JP | 98017621 | | 1/1998 |
| WO | WO 99/41313 | * | 8/1999 |
| WO | WO 00/08071 | * | 2/2000 |
| WO | WO 03/006516 | A1 * | 1/2003 |

OTHER PUBLICATIONS

International Standard ISO 4599, "Plastics—Determination of Resistance To Environmental Stress Cracking (ESC)—Bent Strip Method", First Edition—Apr. 15, 1986.

\* cited by examiner

*Primary Examiner*—David W. Wu
*Assistant Examiner*—Henry S Hu
(74) *Attorney, Agent, or Firm*—Dean M. Harts

(57) ABSTRACT

The invention provides a fluorothermoplastic composition comprising interpolymerized units derived from about 94 to about 97.5 mole percent (mol %) tetrafluoroethylene (TFE), about 2 to about 3 mol % perfluoro (propyl vinyl ether) (PPVE), and about 0.5 to about 3 mol % hexafluoropropylene (HFP). The invention also provides a fluorothermoplastic composition comprising interpolymerized units derived from about 94 to about 97 mol % TFE, about 0.75 to about 3 mol % PPVE, and about 1.5 to about 3.5 mol % HFP. These fluorothermoplastic compositions have a flex life that fits the equation:

$$\log(\text{flex life cycles}) \geq 0.71 + 4.0*(\text{MFI}^{(-0.294)}),$$

a method of making fluorothermoplastic compositions, a method of improving stress crack resistance, and fluorothermoplastic articles.

12 Claims, No Drawings

FLUOROPOLYMERS RESISTANT TO STRESS CRACKING

CROSS REFERENCE TO RELATED APPLICATION

This application is a divisional of U.S. Ser. No. 09/904,235, filed Jul. 12, 2001 now U.S. Pat. No. 6,653,379, now allowed, the disclosure of which is herein incorporated by reference.

TECHNICAL FIELD

This invention relates to melt-processable fluoropolymers having improved stress crack resistance and smooth surfaces after extrusion.

BACKGROUND

Copolymers of tetrafluoroethylene (TFE) and hexafluoropropylene (HFP) are commonly referred to as fluorinated ethylene-propylene (FEP) resins. The HFP content usually ranges between about 10 and 20 weight percent (wt %). The FEP resins are melt-processable, having a melt viscosity adequate for conventional melt processing. However, FEP does not exhibit the high temperature properties and thermal stability of PTFE. Depending on their HFP content, these resins have a crystalline melting point from about 250 to 270° C., and have a maximum use temperature of around 200° C. Typical applications include wire insulation and molded parts.

Copolymers of TFE with perfluoro (propyl vinyl ether) (PPVE) are commonly called perfluoroalkoxy (PFA) resins. The PPVE content usually ranges between about 2 and 10 wt %. The PFA resins generally have better thermal stability and better mechanical properties at high temperatures when compared to FEP resins. The PFA resins are also melt-processable with a crystalline melting point from about 300 to 310° C., and they have properties similar to PTFE. Typical applications include expansion joints and liners for pipes and fittings, tubing, and film. Equipment made from PFA is used extensively in the semiconductor industry for demanding chemical handling applications.

SUMMARY

Briefly, the present invention provides a fluorothermoplastic composition comprising interpolymerized units derived from about 94 to about 97.5 mole percent (mol %) tetrafluoroethylene (TFE), about 2 to about 3 mol % perfluoro (propyl vinyl ether) (PPVE), and about 0.5 to about 3 mol % hexafluoropropylene (HFP). The fluorothermoplastic composition has a number of double flexure cycles to failure (flex life cycles) that fits the equation:

$$\log(\text{flex life cycles}) \geq 0.71 + 4.0 * (\text{MFI}^{(-0.294)}),$$

wherein MFI is melt flow index in grams per 10 minutes and is described below.

In another aspect, the present invention provides a fluorothermoplastic composition comprising interpolymerized units derived from about 94 to about 97 mol % tetrafluoroethylene, about 0.75 to about 3 mol % perfluoro (propyl vinyl ether), and about 1.5 to about 3.5 mol % hexafluoropropylene, which also has a minimum flex life according to the equation above.

The present invention also provides a method of improving stress crack resistance. The invention further provides a method of making a fluorothermoplastic composition comprising the steps of (a) providing comonomers in proportions selected from (i) from about 94 to about 97.5 mol % TFE, from about 2 to about 3 mol % PPVE, and from about 0.5 to about 3 mol % HFP, or (ii) from about 94 to about 97 mol % TFE, from about 0.75 to about 3 mol % PPVE, and from about 1.5 to about 3.5 mol % HFP, and (b) polymerizing the comonomers to produce a fluorothermoplastic, then (c) shaping an article from the fluorothermoplastic, wherein the fluoropolymer has a melt flow index of less than about 25 g/10 min and a Stress Crack Resistance of greater than 24 hours and/or the fluoropolymer has a number of double flexure cycles to failure that fits the equation:

$$\log(\text{flex life cycles}) \geq 0.71 + 4.0 * (\text{MFI}^{(-0.294)}).$$

The present invention also provides fluorothermoplastic articles, such as tubing, tube fittings, film, and coatings.

It is an advantage of the present invention to provide a melt-processable fluorothermoplastic composition useful in applications requiring high chemical resistance and high stress crack resistance.

Other features and advantages of the invention will be apparent from the following detailed description of the invention and the claims. The above summary of principles of the disclosure is not intended to describe each illustrated embodiment or every implementation of the present disclosure. The following description more particularly exemplifies certain preferred embodiments utilizing the principles disclosed herein.

DETAILED DESCRIPTION

The present inventors have recognized that the stress crack resistance property has particular importance. Prior methods of improving the stress crack resistance of tetrafluoroethylene-based plastics involved the addition of perfluoropropylvinyl ether (PPVE) with the problems associated with this method, e.g., difficulty of incorporation during polymerization, multiple melting points over a broad temperature range in the resultant fluoropolymer, higher cost fluoropolymer. The present invention solves these problems and improves the stress crack resistance property of fluoropolymers.

The present invention provides a fluorothermoplastic composition. This composition can be represented as a modification of polymers classified in the art as PFA fluorothermoplastics, which are generally copolymers of TFE with a small amount of PPVE. The fluorothermoplastic composition of the present invention comprises particular ratios of interpolymerized units derived from a combination of TFE, PPVE, and HFP.

Surprisingly, the fluorothermoplastic compositions of the present invention have higher performance at lower levels of PPVE, as compared to known materials. Such higher performance is shown in test results, such as stress crack resistance and flex life.

In the present invention, at least three fluorinated monomers are copolymerized. The primary component is tetrafluoroethylene (TFE), which comprises at least about 90 mole percent (mol %), more preferably at least 94 mol %, of the interpolymerized units in the inventive fluorothermoplastic composition.

At least two other fluorinated monomers are interpolymerized with the TFE. These include perfluoro (propyl vinyl ether) (PPVE), and hexafluoropropylene (HFP). The level of PPVE is from about 0.5 to about 5 mol %, more preferably from about 0.75 to about 3 mol %. The level of HFP is from about 0.25 to about 5 mol %, more preferably from about 0.5 to about 3.5 mol %.

As used herein, the sum of the mol % of each of the first three components described totals 100. When another material is interpolymerized with these three comonomers, it is preferably present at levels below about 10 mol %, more preferably below about 5 mol %, and even more preferably below about 2 mol %, of the total composition including the first three comonomers and any additional material. In such an embodiment, the mol % levels of TFE, PPVE, and HFP described herein are relative to each other and do not include a fourth or other material.

In a particular embodiment, the interpolymerized units are comprised of about 94 to about 97.5 mol % TFE, about 2 to about 3 mol % PPVE, and about 0.5 to about 3 mol % HFP. In another particular embodiment, the interpolymerized units are comprised of about 94 to about 97 mol % TFE, about 0.75 to about 3 mol % PPVE, and about 1.5 to about 3.5 mol % HFP.

In another particular embodiment, the interpolymerized units are comprised of from about 94 to about 97.5 mol % TFE, above about 2 (more preferably above about 2.1 and in some instances above 2.5) to about 3 mol % PPVE, and from about 0.5 to about 3 mol % HFP. In another particular embodiment, the interpolymerized units are comprised of from about 94 to about 97 mol % TFE, from about 0.75 to about 3 mol % PPVE, and from about 1.5 (more preferably from about 1.9, and even more preferably from about 2.2) to about 3.5 mol % HFP.

Minor amounts of additional fluorinated monomers and/or non-fluorinated monomers may be interpolymerized with the compositions described above without departing from the scope of the invention. Other monomers include, for example, perfluorovinyl ethers such as:

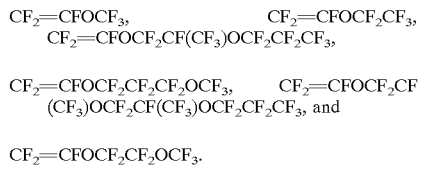

$CF_2$=CFOCF$_2$CF$_2$OCF$_3$.

For some fluoropolymer applications, other monomers particularly those not fully fluorinated are avoided, such as in semiconductor applications where high purity and/or thermal stability is needed. Thus, the fluorothermoplastic composition of the invention may consist essentially of the particular comonomers in the ratios described above.

The melting point of TFE-based fluorothermoplastics decreases as the level of interpolymerized monomers is increased. As the level of interpolymerized monomers is increased further, more than one melt peak may become evident by differential scanning calorimetry. Often the additional melt peaks occur at temperatures above the desired melt peak temperature. One feature of the present invention is the absence of any significant melt peak above 300° C., as measured by differential scanning calorimetry (DSC) according to ASTM D 4591. This means that the sum of the areas under a DSC curve (scan rate of 10° C. per minute) for any peaks above 300° C. total less than about 10%, more preferably less than about 5%, and even more preferably about 0% of the composition. The invention allows compositions having melt peaks below 300° C., which can have end-of-melting points above 300° C.

In most compositions of the present invention, there are no melt peaks above 300° C. Thus, the fluorothermoplastics of the present invention have their major melt peak at a temperature below about 300° C. or even below about 290° C., and above about 250° C., more preferably above about 270° C.

One important property of the inventive fluoropolymer compositions is a smooth surface. Comparatively rough surfaces may trap impurities or provide sites for undesirable biological growth during the useful life of a fluorothermoplastic article containing a fluorothermoplastic composition. Surface roughness can be measured by optical interferometry using commercially available instruments. One such instrument is available as Wyko Optical Profiler Model NT330, available from Veeco, Inc., Tucson, Ariz. A mean level is calculated for a sample surface and the deviation from this mean over the surface area sampled is determined. The average of the absolute deviation from the mean is reported as absolute roughness, Ra, in nanometers. The fluorothermoplastic compositions of the present invention typically have Ra levels below about 150 nm, more preferably below about 125 nm, and even more preferably below about 100 nm. The molecular weight of the composition and the rate of cooling after melt processing can affect surface roughness. Thus, increasing molecular weight or cooling a given composition at a higher rate can minimize spherulite size and reduce surface roughness.

Another important property of the inventive fluoropolymer compositions is stress crack resistance. This property can be evaluated by bending fluoropolymer samples around a small radius and then exposing them to a stress cracking agent in an environment known to cause stress cracking.

Stress cracking agents are those materials known to contribute to stress cracking. Such agents include, for example, alkanes such as iso-octane, lower alcohols such as methanol, and surfactants such as fluorinated surfactants and fluids including surfactants. The activity of these agents may be accelerated with increasing temperature and increasing concentration.

The environment known to cause stress cracking may be the actual conditions to which a final article may be exposed. The environment may be made more severe for accelerated testing purposes, such as by increasing temperature, using a more concentrated or more aggressive agent, and/or increasing the stress applied to the article. The materials of the present invention may be compared with known materials in an accelerated manner by bending samples around a small radius, such as a 5 mm; using solvent such as iso-octane; and using an elevated temperature, such as above about 70° C. The duration of the exposure (in hours) until cracking is reported in hours.

Molecular weight also has been used as an indicator of stress crack resistance, with increasing molecular weight typically providing increasing stress crack resistance. Melt flow index (MFI) correlates with molecular weight and is easily determined. Thus, two materials having a similar MFI can be compared as having similar molecular weight. In the present invention, materials having different compositions can be evaluated at high MFI (low molecular weight) as another form of accelerated testing, which may be used in combination with one or more other acceleration factors. Typical conditions for melt flow testing include a temperature of 372° C. and a 5 kg weight, with further details described in ASTM D-1238. The weight (grams) of material extruded in 10 minutes is reported.

Particular embodiments of the fluorothermoplastic compositions of the present invention have an MFI below about 10 g/10 min., more preferably below about 8 g/10 min., and even more preferably below about 5 g/10 min.

The present invention provides fluorothermoplastic polymers having a Stress Crack Resistance (conditions of 3 mm sample thickness, 5 mm radius bend, iso-octane at 80° C. are used herein as "SCR") of greater than 24 hours when the melt flow index of the fluorothermoplastic composition is less than about 25 g/10 min. More preferably, the fluorothermoplastic composition having a melt flow index of less than about 15 g/10 min also has an SCR of greater than 7 days. Even more preferably, the fluorothermoplastic composition having a melt flow index of less than about 5 g/10 min also has an SCR of greater than 30 days.

Increasing flexural fatigue strength ("Flex Life") also correlates with increasing stress crack resistance. In this test, a film strip is weighted and then flexed through an angle of 90° at a frequency of around 250 double flexures (back and forth) per minute until the strip breaks. The number of cycles until break are recorded as the flex life. More detailed information can be found in ASTM D-2176.

The present inventors have discovered that the materials of the present invention, at a particular composition, show increasing flex life as MFI decreases according to the equation:

$$\log(\text{flex life cycles}) \geq 0.71 + 4.0*(\text{MFI}^{(-0.294)}).$$

In some embodiments, the flex life is higher such that the y-intercept of this equation is also higher, such as 1.0 or even 1.5, rather than 0.71.

Thus, when a particular composition shows promising results in the accelerated testing of SCR and/or Flex Life, the MFI of that material can be decreased to further improve stress crack resistance in the intended end use of the fluoropolymer material. The MFI of each material compared should match to remove the possible performance premium due to lower MFI.

In addition to the parameters described above, the level of reactive end groups may be reduced to improve processing and/or provide other benefits. Generally, a level of reactive end groups below about 150 such end groups per million carbon atoms in the fluoropolymer is preferred (also described as 150 ppm). When desired, the level of reactive end groups can be reduced through methods known in the art to levels of 10 ppm or even lower. In some applications, such as where higher thermal stability and/or higher purity is preferable, low levels are desired.

The present invention also provides a method of improving stress crack resistance which involves the steps of providing a fluorothermoplastic composition as described above, shaping an article from that composition, and exposing the article to a stress cracking agent.

The present invention also provides a method of making a fluorothermoplastic composition comprising the steps of (a) providing comonomers of TFE, HFP and PPVE, then (b) polymerizing the comonomers to produce a fluorothermoplastic in proportions selected from (i) from about 94 to about 97.5 mol % TFE, from about 2 to about 3 mol % PPVE, and from about 0.5 to about 3 mol % HFP; or (ii) from about 94 to about 97 mol % TFE, from about 0.75 to about 3 mol % PPVE, and from about 1.5 to about 3.5 mol % HFP. This is followed by the step of shaping an article from the fluorothermoplastic, such as by extruding through a die to coat a surface or wire, form film or tubing, or extruding into a mold to produce a desired shape. The fluoropolymer thus produced has a melt flow index of less than about 25 g/10 min and a Stress Crack Resistance of greater than 24 hours and/or a number of double flexure cycles to failure that fits the equation:

$$\log(\text{flex life cycles}) \geq 0.71 + 4.0*(\text{MFI}^{(-0.294)}).$$

The fluoropolymer thus produced may also have a Stress Crack Resistance (3 mm thick sample, 5 mm radius bend, iso-octane, 80° C.) greater than a comparative fluorothermoplastic composition having a similar melt flow index. This fluorothermoplastic composition may also have a Stress Crack Resistance greater than a comparative fluorothermoplastic composition having a similar melt flow index and a higher level of PPVE.

Additives such as carbon black, stabilizers, plasticizers, pigments, lubricants, fillers, and processing aids typically utilized in fluoropolymer compounding can be incorporated into the compositions.

This invention is useful in semiconductor applications where smooth surfaces, high purity, and resistance to environmental stress cracking are desirable properties. The invention is useful in shaped articles, such as tubing, tube fittings, films, and coatings.

Objects and advantages of this invention are further illustrated by the following examples, but the particular materials and amounts thereof recited in these examples, as well as other conditions and details, should not be construed to unduly limit this invention.

EXAMPLES

Test Methods

Stress Crack Resistance (SCR). The procedure described in ISO 4599, herein incorporated by reference, was generally followed. Plaques having a 3 mm thickness were compression molded at 360° C. and 49 bar, then cooled at 40° C./min. to room temperature. Samples having a width of 6 mm and a length of 36 mm were cut from the plaques and notched across the width on one side of the sample to a depth of 0.1 mm. Three samples of each material were bent around a 5 mm radius form and then immersed in iso-octane at 80° C. The samples were checked periodically and the time in hours until stress cracking was visually evident (failure designation A1) was recorded for each of the three samples. The average time in hours to cracking of the three samples was reported, unless otherwise indicated.

Melt Flow Index (MFI). The methodology described in ASTM D-1238 was followed using a Tinius Olsen extrusion plastometer at a temperature of 372° C. and a mass of 5 kg. The results are reported in grams per ten minutes.

Flex Life. The flexural fatigue strength ("Flex Life") tests were carried out using a model 956, no. 102 device from Frank, built in 1967. Strips of film having a width 15 mm, a thickness of 1.0 mm, and a minimum length of 100 mm were tested. Adhesive strips were used to hold a film sample of about DIN A5 size to the drum of a film cutter, a draw-knife system was put in place, and the cutting drum was rotated to produce strips at the preset knife separation. The strips of film were clamped into the screw clamps of the flexural fatigue (Frank) device and loaded with a suspended weight of about 1530 g. The weighted strips of film were flexed in the clamping apparatus through an angle of 90° in both directions at a folding frequency of 250 double flexures per minute until fracture occurred. A counter on the device recorded the number of double flexures until fracture. The flexural fatigue strength, or flex life, of a material was the average number of double flexures (flex life cycles) until failure for 3 samples.

Surface Roughness. The inner wall of extruded tubing was evaluated for surface roughness. The samples were cut with a razor blade and coated with Au—Pd twice for 30 seconds each. The samples were imaged using Optical Interferometry, VSI mode (Wyko NT330 optical profiler). The absolute roughness, Ra, defined as the average of the absolute deviation of the surface from the mean level, was calculated for each sample.

Example 1

Fluoropolymer Preparation

A polymerization reactor having a total volume of 40 L provided with an impeller stirrer was charged with 30 L of demineralized water and 122 g of a 30 wt % solution of ammonium perfluorooctanoate. The reactor was sealed, evacuated, and purged with nitrogen, then heated to 70° C. Into the reactor was pumped 240 g liquid $CF_2$=$CFOCF_2CF_2CF_3$ (PPVE-1) and 0.02 bar ethane, followed by stirring while TFE was introduced to reach a total pressure of 12.0 bar. Then HFP was introduced to reach a total pressure of 17.0 bar. The polymerization was initiated by pumping in 2 g of ammonium persulfate (APS), dissolved in 100 mL of demineralized water. When the pressure began to fall, additional TFE was added according to the target ratio of TEF/PPVE/HFP, to maintain a total pressure of 17.0 bar. The heat liberated was dissipated by cooling the vessel wall to maintain the temperature at 70° C. After a total of 12 kg of TFE was fed into the reactor, the monomer feed was interrupted, the pressure in the reactor was released and the reactor is flushed several times with nitrogen. The resultant amount of 42 kg of polymer dispersion with a solids content of 31% was discharged from the bottom of the reactor. After the dispersion was transferred into a 180 L stirring vessel, the volume was increased to 100 L by adding demineralized water and 200 mL of concentrated hydrochloric acid. The dispersion was stirred until the solid had separated from the aqueous phase.

The flocculent powder precipitated after stirring was granulated with 6.9 L of a petroleum fraction, the petroleum fraction is driven off using steam, and the granules were then washed six times by vigorous and thorough stirring with 100 L of demineralized water on each occasion. The moist powder was dried for 12 hours at 250° C. under nitrogen. This gave 12.1 kg of a terpolymer according to the invention having a PPVE content of 2.9 weight percent (wt %) (1.1 mol %), an HFP content of 4.3 wt % (3.0 mol %), with the balance being TFE, as determined via FTIR.

The Melt Flow Index (MFI) of the copolymer was determined to be 25 g/10 min., and a Stress Crack Resistance of over 3 days (81 h). The melting point of the copolymer was 284° C. via DSC, and no melt peaks above 300° C. were evident.

Example 2

This was prepared as in Example 1 to reach a fluoropolymer having 4.7 wt % PPVE (1.8 mol %) and 2.7 wt % HFP (1.9 mol %), with the balance being TFE. The Melt Flow Index (MFI) of the copolymer was determined to be 22 g/10 min. This material had no sign of failure after exposure to the Stress Crack Resistance test for over 5 months.

Example 2 showed that modifying the amount of PPVE and HFP resulted in a material having even longer stress life. The melting point of the copolymer was 290° C. via DSC, and no melt peaks above 300° C. were evident.

Comparative Examples 1–2

Comparative Example 1 (CE1) was Dyneon™ PFA X 6525N and Comparative Example 2 (CE2) was Dyneon™ PFA 6515N, both available from Dyneon LLC, Oakdale, Minn., although these could have been prepared as in Example 1 except that no HFP would be added. Each material was 3.6 wt % PPVE, with the balance in each being TFE. CE1 had an MFI of 24 g/10 min., while CE2 had an MFI of 15 g/10 min. The material of CE1 cracked upon the initial exposure to iso-octane, while the material of CE2 exhibited a Stress Crack Resistance of 24 h.

Comparative Example 3

This was a fluoropolymer having 3.1 wt % PPVE and 0.4 wt % HFP, with the balance being TFE, previously sold as PFA 6515 by Hoechst, although it could have been prepared as described in Example 1. Comparative Example 3 (CE3) had an MFI of 15 g/10 min., and showed failure upon the initial exposure to the SCR test.

While the terpolymer of Example 1 had a higher MFI (therefore a lower molecular weight) than Comparative Examples 1–3, it significantly and unexpectedly outperformed them in the Stress Crack Resistance test. In addition to their higher molecular weights, all of the comparative materials contained higher levels of PPVE than Example 1.

These Examples show that the addition of a small amount of HFP significantly enhanced the stress-cracking resistance of PFA.

TABLE 1

Compositions and Test Results

| Ex. | PPVE | HFP | MFI | SCR (h) | Tm (° C.) |
|---|---|---|---|---|---|
| 1 | 2.9 | 4.3 | 25 | 81 | 284 |
| 2 | 4.7 | 2.7 | 22 | >5 mos. | 290 |
| CE 1 | 3.6 | 0 | 24 | 0 | 310 |
| CE 2 | 3.6 | 0 | 15 | 24 | 310 |
| CE 3 | 3.1 | 0.4 | 15 | 0 | 310 |

Example 3

This was prepared as in Example 1 to reach a fluoropolymer having 5.5 wt % PPVE (2.2 mol %) and 2.1 wt % HFP (1.5 mol %), with the balance being TFE. The Melt Flow Index (MFI) of the copolymer was determined to be 3.4 g/10 min. The melting point of the copolymer was 280° C. via DSC, and no melt peaks above 300° C. were evident.

Comparative Example 4

This was prepared as in Example 1 to reach a fluoropolymer having 6.7 wt % PPVE, with the balance being TFE. The Melt Flow Index (MFI) of the copolymer was determined to be 3.4 g/10 min.; the same as Example 3.

TABLE 2

Compositions and Test Results

| Ex. | PPVE | HFP | MFI | Flex Life | Tm (° C.) |
|---|---|---|---|---|---|
| 3 | 5.5 | 2.1 | 3.4 | 32,247 | 280 |
| CE 4 | 6.7 | 0 | 3.4 | 26,337 | 303, 313 |

A comparison of the terpolymer of Example 3 to Comparative Example 4 (CE-4) demonstrates that a material at the same MFI with HFP added and with a lower level of PPVE had improved flex life, a measurement known to be related to stress crack resistance.

In addition, CE-4 had two melt peaks, both above 300° C., which can make it more difficult to process than Example 3 material. Thus, increasing the PPVE level led to multiple melt peaks above 300° C. and more difficult processing.

Example 4

This was prepared as in Example 1, except made in a larger scale, to reach a fluoropolymer having 5.6 wt % PPVE (2.2 mol %) and 1.3 wt % HFP (0.9 mol %), with the balance being TFE. The Melt Flow Index (MFI) of the copolymer was determined to be 2.5 g/10 min. The copolymer was treated with fluorine to reduce the level of reactive end groups.

Pellets of the material were extruded using a Davis Standard extruder into tubing of 0.5 inch (12.7 mm) outer diameter and 0.06 inch (1.5 mm) wall thickness. The extruder had a 1.5 inch (38.1 mm) diameter conventional mixing screw, a length/diameter ratio of 26, and compression ratio of 2.6:1. The die outer and inner annulus diameters were 1.580 inch (40 mm) and 1.185 inch (30 mm), respectively. The extrusion screw speed was 20.5 rpm. The temperature profile and other extrusion conditions are given in Table 3. The tubing was quenched in a cooling tank of recirculating water at ambient temperature. The surface roughness of the inner wall of the tube was evaluated by optical interferometry and is summarized in Table 3.

The melting point of the copolymer was 289° C. via DSC, and no melt peaks above 300° C. were evident. The concentration of reactive end groups was measured to be 10 ppm.

Comparative Example 5

This was a commercial PFA copolymer (TFE with a small amount (4.2 wt %) of PPVE) available as Dyneon™ PFA X6502 UHP from Dyneon LLC, Oakdale, Minn. The copolymer had a melting point of 310° C. and the MFI of the copolymer was 2.2 g/10 min. Tubing was extruded as in Example 4, and the surface roughness of the inner wall was evaluated by optical interferometry and summarized in Table 3.

TABLE 3

Extrusion Conditions and Test Results

| Ex. | Extrusion Line Speed (ft./ min.) | (cm/ min.) | Temperature (° C.) Zone 1 | Zone 2 | Zones 3, 4 | Die end | Ra (nm) |
|---|---|---|---|---|---|---|---|
| 4 | 2.6 | 79.2 | 310 | 330 | 350 | 360 | 85 |
| 4 | 2.4 | 73.2 | 330 | 350 | 370 | 380 | 93 |
| 4 | 3.6 | 109.7 | 350 | 370 | 390 | 400 | 73 |
| CE 5 | 2.6 | 79.2 | 310 | 330 | 350 | 360 | 194 |
| CE 5 | 2.4 | 73.2 | 330 | 350 | 370 | 380 | 157 |
| CE 5 | 3.4 | 103.6 | 350 | 370 | 390 | 400 | 322 |

A comparison of the absolute roughness, Ra, demonstrates that the composition of Example 4 gives a smoother surface when the material is extruded into tubing compared to the Comparative Example 5 when extruded under similar conditions.

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A method of improving stress crack resistance comprising the steps of:
    a) providing a fluorothermoplastic composition comprising interpolymerized units derived from:
        about 94 to about 97.5 mole percent (mol %) tetrafluoroethylene (TFE);
        about 2 to about 3 mol % perfluoro (propyl vinyl ether) (PPVE); and
        about 0.5 to about 3 mol % hexafluoropropylene (HFP);
        wherein the fluorothermoplastic lacks a significant melt peak above 300° C. as measured via differential scanning calorimetry (DSC), and/or a number of double flexure cycles to failure that fits the equation:

$$\log(\text{flex life cycles}) \geq 0.71 + 4.0*(\text{MFI}^{(-0.294)});$$

b) shaping an article from the composition; and
    c) exposing the article to a stress cracking agent.

2. The method of claim 1 wherein the stress cracking agent is selected from alkanes, lower alcohols, or fluorinated surfactants.

3. The method of claim 1 wherein the step of exposing the article endures for at least 30 days without the occurrence of stress cracking.

4. The method of claim 1 wherein the article is selected from tubing, tube fittings, films, or coatings.

5. The method of claim 1 wherein the resultant fluorothermoplastic additionally has at least one property selected from: a surface roughness below about 150 nm as measured by optical interferometry; a Stress Crack Resistance greater than a comparative fluorothermoplastic composition having a similar melt flow index; and a Stress Crack Resistance greater than a comparative fluorothermoplastic composition having a similar melt flow index and a higher level of PPVE.

6. The method of claim 1 further comprising one or more comonomers selected from the group consisting of:

$CF_2=CFOCF_3,$   $CF_2=CFOCF_2CF_3,$
$CF_2=CFOCF_2CF(CF_3)OCF_2CF_2CF_3,$ $CF_2=CFOCF_2CF(CF_3)OCF_2CF(CF_3)OCF_2CF_2CF_3,$
$CF_2=CFOCF_2CF_2OCF_3,$ and $CF_2=CFOCF_2CF_2CF_2OCF_3.$ 7. A method of improving stress crack resistance comprising the steps of:
    a) providing a fluorothermoplastic composition comprising interpolymerized units derived from:
        about 94 to about 97 mole percent (mol %) tetrafluoroethylene;
        about 0.75 to about 3 mol % perfluoro (propyl vinyl ether); and
        about 1.5 to about 3.5 mol % hexafluoropropylene;
        wherein the fluorothermoplastic lacks a significant melt peak above 300° C. as measured via differential scanning calorimetry (DSC); and/or a number of double flexure cycles to failure that fits the equation:

$$\log(\text{flex life cycles}) \geq 0.71 + 4.0 * (\text{MFI}^{(-0.294)});$$

b) shaping an article from the composition; and
c) exposing the article to a stress cracking agent.

8. The method of claim 7 wherein the stress cracking agent is selected from alkanes, lower alcohols, or fluorinated surfactants.

9. The method of claim 7 wherein the step of exposing the article endures for at least 30 days without the occurrence of stress cracking.

10. The method of claim 7 wherein the resultant fluorothermoplastic additionally has at least one property selected from: a surface roughness below about 150 nm as measured by optical interferometry; a Stress Crack Resistance greater than a comparative fluorothermoplastic composition having a similar melt flow index; and a Stress Crack Resistance greater than a comparative fluorothermoplastic composition having a similar melt flow index and a higher level of PPVE.

11. The method of claim 7 further comprising one or more comonomers selected from the group consisting of:

$$CF_2=CFOCF_3, \quad CF_2=CFOCF_2CF_3,$$
$$CF_2=CFOCF_2CF(CF_3)OCF_2CF_2CF_3,$$

$$CF_2=CFOCF_2CF(CF_3)OCF_2CF(CF_3)OCF_2CF_2CF_3,$$
$$CF_2=CFOCF_2CF_2OCF_3, \text{ and}$$

$$CF_2=CFOCF_2CF_2CF_2OCF_3.$$

12. The method of claim 7 wherein the article is selected from tubing, tube fittings, films, or coatings.

* * * * *

UNITED STATES PATENT AND TRADEMARK OFFICE
CERTIFICATE OF CORRECTION

PATENT NO. : 6,984,697 B2  Page 1 of 1
APPLICATION NO. : 10/680537
DATED : January 10, 2006
INVENTOR(S) : Blong, Thomas J.

It is certified that error appears in the above-identified patent and that said Letters Patent is hereby corrected as shown below:

Column 1,
Line 8: after "2001" insert -- , --

Column 1,
Line 8: after "6,653,379," delete "now allowed"

Column 7,
Line 40: "The flocculent powder..." should be "The flocculant powder..."

Signed and Sealed this

Twenty-fifth Day of July, 2006

JON W. DUDAS
*Director of the United States Patent and Trademark Office*